United States Patent [19]
Helmer

[11] 3,832,913
[45] Sept. 3, 1974

[54] MAGNETIC TORQUE CONVERTOR FOR PROPULSION SYSTEMS

[75] Inventor: Robert Helmer, Setauket, N.Y.

[73] Assignee: The Enercon Corporation, Setauket, N.Y.

[22] Filed: Sept. 7, 1972

[21] Appl. No.: 286,876

[52] U.S. Cl.............. 74/764, 105/97, 105/130, 310/93
[51] Int. Cl............. F16h 57/10, H02k 49/04
[58] Field of Search ........... 74/764, 765, 785, 768; 310/93; 105/97, 130

[56] References Cited
UNITED STATES PATENTS

| 533,912 | 2/1895 | Moise | 192/64 |
|---|---|---|---|
| 658,620 | 9/1900 | Clarke et al. | 74/764 |
| 1,301,811 | 4/1919 | Burgess | 74/764 X |
| 2,073,926 | 3/1937 | Fraser | 310/93 |
| 2,603,678 | 7/1952 | Helmer | 310/103 |
| 3,116,817 | 1/1964 | Quick et al. | 74/764 X |
| 3,174,064 | 3/1965 | Muller | 310/93 X |
| 3,407,677 | 10/1968 | Troeger | 74/764 X |
| 3,561,367 | 2/1971 | Black et al. | 105/96.2 X |

Primary Examiner—Allan D. Herrmann
Attorney, Agent, or Firm—Edward H. Loveman

[57] ABSTRACT

A magnetic torque convertor includes two planetary gear sets respectively coupled to two coercive force brakes which control their driving speed. An input drive shaft is coupled to one planetary gear set which includes a planetary gear carrier coupled to a ring gear of the other planetary gear set. An output drive shaft is coupled to a planetary gear carrier of the other planetary gear set. The planetary gear sets have different gear ratios for driving the output shaft at different speeds under control of the brakes which are energized by direct current of variable magnitude.

8 Claims, 6 Drawing Figures

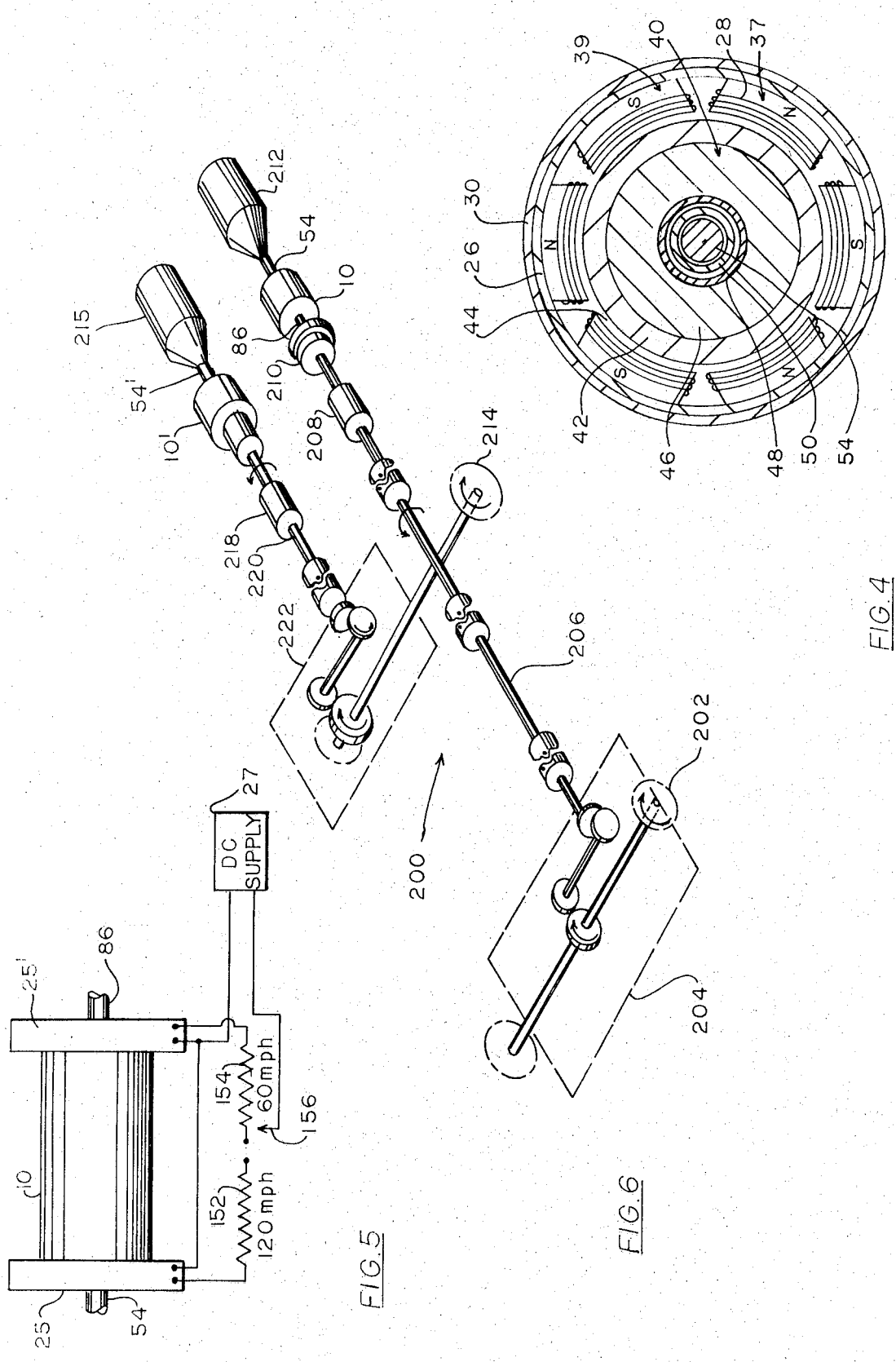

MAGNETIC TORQUE CONVERTOR FOR PROPULSION SYSTEMS

This invention concerns a magnetic torque convertor for use in a propulsion system of a train, boat or other vehicle.

The invention involves improvements over the torque convertors described in my U.S. Pat. Nos. 2,603,678 and 2,779,548. In these prior patents a coercive force brake was employed to transmit a driving torque between a driving motor and a driven mechanical load.

In the present invention there is provided a torque convertor having two discrete torque stages, each with an infinitely variable speed range. The convertor includes two variable speed planetary gear sets having different output torque ratios. Associated with each gear set is a coercive force brake. The ring gears of these planetary gear sets are selectively held against rotation or permitted to rotate to provide variable driving speeds, magnetically through use of one of the associated coercive force brakes.

Each coercive force brake includes a stator and rotor. The stator is a stationary annular assembly which serves as a flux generator with alternate north and south magnetic poles. The rotor includes a coercive force steel ring which rotates within the stator ring. The rotor ring is made of magnetizable high hysterises loss material. There is no mechanical contact between rotor and stator so there is no mechanical friction therebetween. Friction is entirely molecular.

In the magnetic torque convertor according to the invention, the two planetary gear sets are axially spaced apart. These may be designated respectively the forward planetary set and the rear planetary set. Each planetary has an internal toothed ring gear which is integral with the coercive force ring of the associated coercive force brake. The coercive force ring rotates in and coacts with the magnetic field set up by the magnetic flux generator associated with it. The flux generator is bolted to the housing enclosing it and provides the reaction torque for the ring gear through the coercive force ring.

It is therefore a principal object of the present invention to provide a magnetic torque convertor between a prime mover and a driven load.

A further object of the present invention is to provide a magnetic torque convertor for a propulsion system having a planetary gear set and an associated coercive force brake controlling the speed applied between a driving motor or turbine and the driven wheels of a vehicle.

It is still another object of the present invention to provide a magentic torque convertor for a propulsion system of the aforementioned type wherein the ring gear is integral with a coercive force ring of a planetary gear set.

These and other objects and many of the attendant advantages of this invention will be readily appreciated as the same becomes better understood by reference to the following detailed description when considered in connection with the accompanying drawings in which:

FIG. 4 is a reduced cross sectional view taken along line 4—4 of FIG. 1;

FIG. 5 is a diagram of a magnetic torque convertor with an associated electrical circuit; and FIG. 6 is a diagram of a locomotive propulsion system including magnetic torque convertors, according to the invention.

Figure 1:
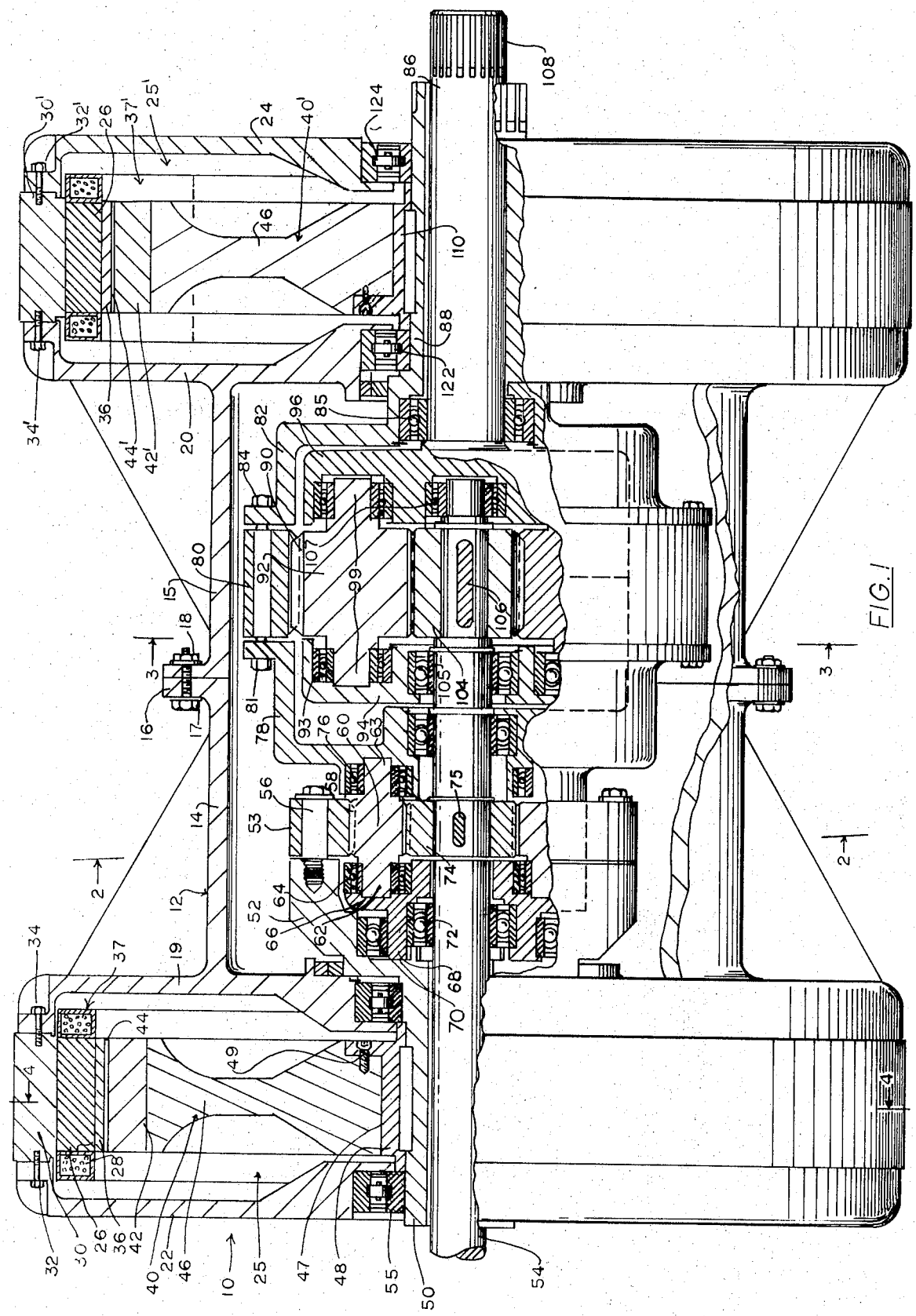
FIG. 1 is a longitudinal sectional view through a magnetic torque convertor embodying the invention.
Figure 3:
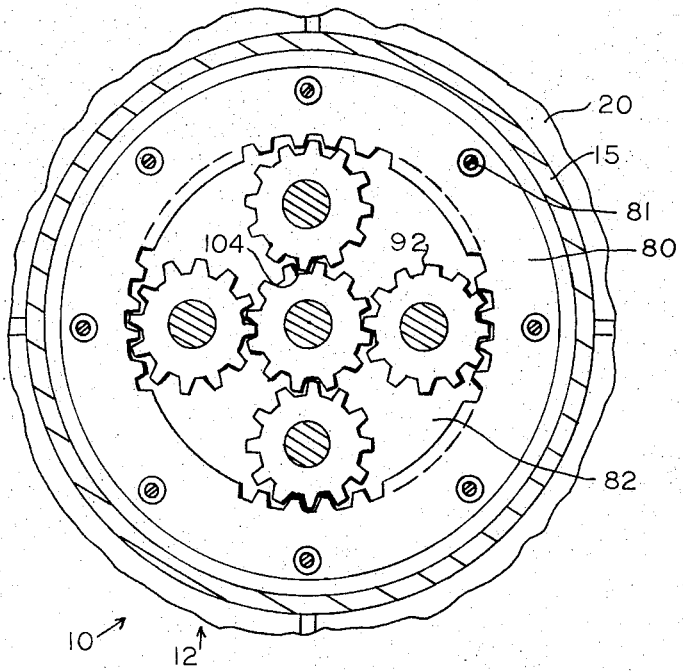
FIG. 3 is a cross sectional view taken along lines 3—3 of FIG. 1.
Figure 2:
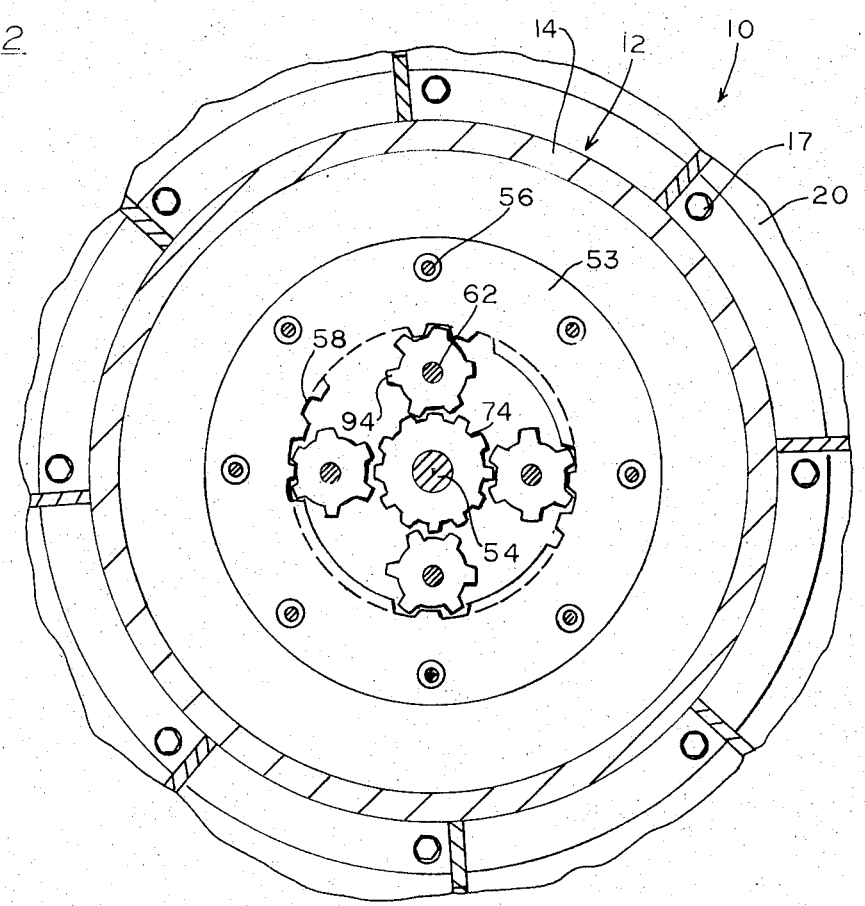
FIG. 2 is a cross sectional view taken along lines 2—2 of FIG. 1.

Referring now to the drawings wherein like reference characters designate like or corresponding parts throughout, there is illustrated in FIGS. 1-4, a coercive force torque convertor 10 having a housing 12 defined to two axially aligned cylindrical casings 14 and 15 each having an abutting annular flange 16 secured together by bolts 17 and nuts 18. The other ends of the casings 14 and 15 are formed with annular flanges 19 and 20 respectively. Circular end plate 22 and 24 are mounted at opposite ends of the assembly. A coercive force brake 25 is enclosed between the flange 19 and the end plate 22. This brake comprises a multiplicity of arcuate magnetic cores 26 around which are wound coils 28 connected in circuit with an external source of direct current 27 (FIG. 5). The cores 26 are secured to a cylindrical ring 30. A plurality of bolts 32 secure the end plate 22 to the ring 30, and a plurality of bolts 34 secure the ring 30 to the flange 19. Attached to each core 26 is an arcuate pole shoe 36. This assembly of cores 26, coils 28 and pole shoes 36 constitutes the stator 37 which is the magnetic flux generator portion of the brake 25. The pole shoes 36 are each magnetically polarized alternately north (N) or south (S).

Concentrically disposed within the stator is a rotor 40 which includes a coercive force ring 42 made of magnetizable steel having a high hysteresis loss characteristic. The ring 42 is closely spaced from the pole shoes 36 by a narrow air gap 44 and is mounted on a spider like disc 46 having a central opening 47 with a hub 48 secured therein by a plurality of bolts 49. The hub 48 is secured to a sleeve 50 which extends axially from a cylindrical support 52 of the ring gear 53. The sleeve 50 surrounds an axial shaft 54 which serves as the input drive shaft of the convertor 10. Roller bearings 55 rotatably support the rotor 40 in the end plate 22 and the flange 19.

The ring gear 53 is secured to the support 52 by a plurality of bolts 56 and has internal teeth 58 meshed with teeth of a plurality of planetary gears 60. Each of the gears 60 has an integral stub shaft 62 which is journaled in a bearing 64 carried by an annular planetary gear carrier 66. The gear carrier 66 has an axial sleeve extension 68 journaled externally in a bearing assembly 70 mounted inside the support 52 of the ring gear 53. The sleeve extension 68 is journaled internally on a ball bearing assembly 72 mounted on the drive shaft 54. Secured on the drive shaft 54 is a sun gear 74 held in place by a key 75. Each of the integral stub shafts 62 are journaled in a bearing 76 which is carried by annular plate 78 surrounding the shaft 54.

The plate 78 carries another ring gear 80 which is larger in diameter than the ring gear 53 and is supported on the plate 78 by a plurality of bolts 81, and is further supported on another annular plate 82 by a plurality of bolts 84. The plate 82 is supported by a bearing assembly 85 on an output shaft 86 which is coaxial with the drive shaft 54. The plate 82 has an axial sleeve extension 88 surrounding but radially spaced from the output shaft 86.

The ring gear 80 has internal teeth 90 meshed with teeth of a plurality of planetary gears 92 which have integral stub shafts 99 journaled in a bearing 93 carried by two gear carrier plates 94 and 96 rotatable around the input shaft 54 and supported by bearing assemblies 105 and 107 respectively. The planetary gears 92 are larger in diameter than the planetary gears 60 and are meshed with a sun gear 104 secured by a key 106 on the input shaft 54.

The output drive shaft 86 is axially aligned with the input shaft 54 and is formed as an integral axial extension of the gear carrier plate 96. The shaft 86 has a splined end 108 for coupling to a mechanical load. Secured on the sleeve extension 88 which surrounds the shaft 86 is another hub 110 carrying another spider like disc 46 forming a part of a rotor 40' of a second coercive force brake 25'.

The brake 25' is arranged like the brake 25 and includes a stator 37' comprising arcuate magnetic cores 26' around which are wound a plurality of coils 28' connected in circuit with the 27 external source of direct current (FIG. 5). The cores 26' are secured to a cylindrical ring 30'. A plurality of bolts 32' secure the end plate 24 to the ring 30' and a plurality of bolts 34' secure the ring 30' to the flange 20. Attached to each core 26' is an integral arcuate pole shoe 36'. This assembly of cores 26' coils 28' and pole shoes 36' constitute the stator 37' of the brake 25' and serves as a magnetic flux generator. A rotor 40' includes a coercive steel ring 42' made of magnetizable steel and having a high hysteresis loss characteristic. The ring 42' is closely spaced from the pole shoes 36' by a narrow air gap 44' and is mounted on a spider like disc 40' which is journaled to rotate between the flange 20 and the end plate 24 by roller bearing assemblies 122 and 124.

FIG. 5 shows schematically the electrical circuit associated with the brakes 25 and 25' of the torque convertor 10. One terminal of each of the brakes 25, 25' is connected to one terminal of the DC supply 27. The other terminal of each of the brakes 25, 25' is connected to one end of a respective resistor 152, 154 of a rheostat which has a throttle arm 156 connected to the other terminal of DC supply 27 and serves as a train speed control. The speed of the output shaft depends then not on the input speed of the shaft 54 but on the adjustment of current in the respective brakes depending on the setting of throttle arm 156.

In operation of the coercive force torque convertor 10, the ring gears 53 and 80 are either held against rotation or permitted to rotate to provide variable speeds magnetically through the coercive force brakes 25 and 25'. The input drive shaft 54 drives both the sun gears 74 and 104. The planetary gear sets have different ratios. Operation of either of the brakes 25 or 25' causes rotation of the gear carrier 66 or 96 to drive the output shaft 86 at different speeds. The speed ranges are infinitely variable through adjustment of the throttle control arm 156.

It will be noted that the sun gears 74 and 104 of both planetary sets are keyed to the input shaft 54. The planet gear carrier 66 and 78 and the ring gear 80 rotate together as a unit. The planet carrier 96 drives the output shaft 86. The planetary sets have different gear ratios; for example the planetary set 80, 92 and 104 may have a ratio of 4:1 while the planetary set 53, 60 and 74 may have a ratio of 3:1. The convertors may be installed in a train locomotive. When the locomotive is not moving, the ring gear 53 and its associated coercive force ring 42 rotate in an opposite direction of shaft 54. When the locomotive accelerates to a predetermined speed, such as 60 miles per hour, the ring gear 53 and ring 42 rotate at one-half the input speed of the drive shaft 54 and in the opposite direction. The planet gear carrier 66, 78 and the ring gear 80 and its coercive force ring 42' rotate at one-third of the input speed in opposite direction when the locomotive is not moving. With an input speed of 6,000 RPM at the shaft 54, the ring gear 80 will have a speed range of zero to 2,000 RPM, while maintaining a torque ratio of 4:1. When a current is applied to the coils 28', the reverse motion of the ring 80 will be partially arrested giving the locomotive forward motion, and as the current is increased the locomotive speed increases. This continues until the ring gear 80 is at zero speed at which time the output shaft is turning at 1,500 RPM and the train is running at 60 miles per hour. To further increase the train speed the current is now transferred to the coils 28. The annular plate 78 and the planet carrier 66 of the planetary gears 62 will now hold the reaction torque of the planetary ring gear 80. As the current to the coils 28 is increased, the planet carrier-ring gear combination 66, 78, 80 increases in speed until it rotates at one-third of the input speed of the shaft 54 and in the same direction. The torque ratio of the planetary set 80, 92, 104 from the time current is transferred to the coils 28, is 2:1 and the output speed varies from 1,500 RPM to 3,000 RPM, bringing the locomotive speed up to 120 miles per hour.

FIG. 6 shows diagrammatically propulsion system 200 of a train locomotive having rear wheels 202 connected via a gear train 204 to a drive shaft 206, which is coupled via a forward reverse gear box 208 and an overrunning clutch 210 to the shaft 86 of the coercive force torque convertor 10 such as described above. The purpose of the overrunning brake 210 is to permit D.C. power to be picked up from a third rail when the train is traveling through a tunnel and the turbines are not operating. The input shaft 54 of the torque convertor 10 is connected to output of a turbine 212. The front wheels 214 of the locomotive may be driven by another turbine 215 which has its output coupled to an input shaft 54' of another coercive force convertor 10' similar in construction to the convertor 10. The output of the convertor 10' is connected to another gear box 218 coupled via a drive shaft 220 to another gear train 222 directly driving the wheels 214.

In operation of the propulsion system 200, the train locomotive is put in readiness by first starting the turbines 212, 215 under no-load conditions and then brought to full speed. Suppose for example this speed is 6,000 RPM. The train locomotive is now started by passing current into the coercive force brakes 25' of both torque convertors 10 and 10'. With the brakes fully excited, the locomotive will accelerate from zero up to a predetermined speed. As one example, a three car train with a loaded weight of 128 tons, may accelerate from zero to 60 miles per hour in 60.8 seconds in a distance of 1.2 miles. Then the brakes 25 may be excited. The train can then be accelerated to 120 miles per hour. It is possible to accelerate from zero to 120 miles per hour in 3.7 minutes in a distance of 7.05 miles. As a further example a seven car train with loaded weight of 208 tons can be accelerated from zero to 60 miles per hour in 98 seconds in a distance of 1.69 miles. It can be accelerated from zero to 120 miles per hour in 8.55 minutes in a distance of 17.3 miles. These high rates of acceleration exceed the best possible performance attainable with turbines of given size driving a train through conventional hydraulic torque convertors.

For most efficient operation, after the train has been brought to a desired speed, the throttle should be used to effect further speed changes. As an example, if the train is in an area where a speed of 40 miles per hour is desired, the turbine throttle may be positioned to drive at 6,000 RPM input to the drive shafts 54. The convertor rheostats may be adjusted to deliver increasing amounts of current to the brakes. This will permit the train to reach the speed of 40 miles per hour in the shortest possible time. The turbine throttle may then be set so that the engine runs at 4,000 RPM to maintain the speed of 40 miles per hour. Furthermore, if the train is going through freight yards, switches, signals, etc. a slow rate of speed can be obtained by throttle control of the turbines. Then for quick recovery to top speed, the turbine throttles may be set for 6,000 RPM and the current in the coercive force brakes reduced so that the turbines can come to top speed without load. With this accomplished, the current in the brakes may be increased and the train will accelerate to desired operating speed in the shortest possible time.

Instead of driving the torque converters directly by the turbines, it is possible to employ alternators which are driven by the turbines. The alternators in turn provide alternating current to drive AC induction motors which may be coupled to the input shafts of the convertors. The units chosen to drive the convertors will depend on performance requirements, weight, cost, etc. In any case, torque convertors as described herein will serve as the transmission means between the input drive shafts 54 and output shafts 86.

It should be understood that the foregoing relates to only a preferred embodiment of the invention, which have been by way of example only and that it is intended to cover all changes and modifications of the example of the invention herein chosen for the purposes of the disclosure, which do not constitute departures from the spirit and scope of the invention.

The invention claimed is:

1. A magnetic torque converter for coupling a prime mover to a load which is to be driven from zero speed through a plurality of driving speeds said converter comprising,
a fixed housing,
an axial input drive shaft and an output drive shaft carried by said housing,
first and second axially spaced magnetic coercive force brakes in said housing co-axial and coupled respectively with said shafts
a first planetary gear set operatively coupled between said input drive shaft and said first brake, a second planetary gear set operatively coupled between said second brake and said output drive shaft said first and second planetary gear sets, each comprising,
a sun gear secured to said input drive shaft,
a plurality of planetary gears meshed with said sun gear for rotation thereby, and
a ring gear meshed with and surrounding said planetary gears to cause the same to revolve around the respective shaft; and
wherein each of said brakes comprises,
an annular array of stationary electromagnetic poles secured to the inner periphery of said housing,
wherein said ring gear from each of said planetary gear sets is rigidly coupled to a magnetizable ring with a high hysteresis loss characteristic, said magnetizable ring being spaced from said electromagnetic poles by a narrow air gap, and
means for energizing said electromagnetic poles whereby a magnetic flux is generated in the respective brake.

2. A magnetic torque converter as defined in claim 1 further including
coupling means operatively coupling said first and second planetary gear sets, so that the relative speed of rotation of said first and said second shafts is determined by the magnetic flux generated in the respective brakes.

3. A magnetic torque convertor as defined in claim 2 wherein said first planetary gear set further includes a rotatable planet gear carrier supporting said planetary gears and rotating around said input drive shaft, whereby the speed of rotation of said planet gear carrier is determined by the magnetic flux generated in said first brake.

4. A magnetic torque convertor as defined in claim 2, wherein said second planetary gear set further includes
a second rotatable planet gear carrier supporting the planetary gears of said second planetary gear set and rotating around said input drive shaft, said second planet gear carrier being coupled directly to said second shaft, whereby the speed of rotation of said second shaft is determined by coercive forces exerted by the brakes on the respective ring gears.

5. A magnetic torque converter as defined in claim 4, wherein said planetary gears and said ring gear of said first gear planetary set have different diameters then the planetary gears and the ring gear of said second planetary gear set so that the two planetary gear sets have different gear ratios with respect to their respective sun gears.

6. A train propulsion system, comprising:
a drive motor;
rotatable train wheels; and
a magnetic torque convertor operatively coupling said motor and said wheels for driving said wheels, said torque convertor comprising,
a housing;
axially aligned input and output drive shafts carried by said housing;
first and second axially spaced magnetic coercive force brakes in said housing coaxial with said shafts;
a first planetary gear set operatively coupled between the input drive shaft and first brake;
a second planetary gear set coupled between said second brake and said output drive shaft; and
coupling means operatively coupling said first and second planetary gear sets, so that the relative speed of rotation of said first and said second shafts is determined by the magnetic flux generated in the respective brakes.

7. A train propulsion system as defined in claim 6, wherein said motor is a turbine and wherein the input drive shaft is coupled directly to said turbine; and further comprising
- a gear train operatively coupling said wheels to said output shaft of said magnetic torque convertor for driving said wheels at speeds controlled by said brakes in said torque convertor.

8. A train propulsion system as defined in claim 6, wherein said motor is a turbine and wherein said input drive shaft is coupled directly to said turbine; and further comprising;
- a gear train operatively coupled to said wheels to drive the same; and
- an overrun clutch operatively connected between said gear train and said output drive shaft of said magnetic torque convertor, whereby driving torque is transmitted between said turbine and said wheels at speeds controlled by said brakes in said torque convertor.

* * * * *